US011358675B2

(12) United States Patent
Korte et al.

(10) Patent No.: US 11,358,675 B2
(45) Date of Patent: Jun. 14, 2022

(54) LOCKABLE STEERING MECHANISM FOR RIDE-ON VEHICLE

(71) Applicant: Radio Flyer Inc., Chicago, IL (US)

(72) Inventors: Joseph Korte, Chicago, IL (US);
Collin Ostergaard, Chicago, IL (US);
Cameron Eckert, Chicago, IL (US);
Jacob Swan, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 17/067,976

(22) Filed: Oct. 12, 2020

(65) Prior Publication Data

US 2021/0107553 A1 Apr. 15, 2021

Related U.S. Application Data

(60) Provisional application No. 62/913,229, filed on Oct. 10, 2019.

(51) Int. Cl.
*B62D 1/183* (2006.01)
*B62K 21/24* (2006.01)
*B62D 1/04* (2006.01)
*B62K 9/00* (2006.01)

(52) U.S. Cl.
CPC ............... *B62K 21/24* (2013.01); *B62D 1/04* (2013.01); *B62D 1/183* (2013.01); *B62K 9/00* (2013.01)

(58) Field of Classification Search
CPC . B62D 1/183; B62D 1/04; B62K 9/00; B62K 21/24
See application file for complete search history.

(56) References Cited

U.S. PATENT DOCUMENTS

| 4,787,647 A | | 11/1988 | Oh | |
|---|---|---|---|---|
| 5,409,263 A | * | 4/1995 | Klawitter | A63H 17/06 280/263 |
| 6,082,754 A | * | 7/2000 | Jeunet | B62K 9/00 280/272 |

(Continued)

FOREIGN PATENT DOCUMENTS

WO WO2013036990 3/2013

OTHER PUBLICATIONS

International Search Report and Written Opinion issued to PCT/US20/55195, dated Jan. 28, 2021.

(Continued)

*Primary Examiner* — Frank B Vanaman
(74) *Attorney, Agent, or Firm* — Barnes & Thornburg LLP

(57) ABSTRACT

A lockable steering mechanism for a children's ride-on vehicle is provided. The steering mechanism has a steering shaft coupled to a steering link that is coupled to the vehicle's front wheels. A steering wheel is axially fixed to the steering shaft. A lifter guide is rotationally and axially fixed to the steering shaft, and a lifter is rotationally fixed to and axially moveable about the lifter guide. A rotatable locking ring rotates from a first position to a second position. The lifter engages the steering wheel when the locking ring is in the first position to rotationally fix the steering wheel to the steering shaft. The lifter is rotationally decoupled from the steering wheel when the locking ring is in a second position to rotationally decouple the steering wheel from the steering shaft.

17 Claims, 12 Drawing Sheets

(56) References Cited

U.S. PATENT DOCUMENTS

| | | | | |
|---|---|---|---|---|
| 6,105,982 A * | 8/2000 | Howell | ............... | B62K 9/00 |
| | | | | 280/91.1 |
| 2006/0214409 A1* | 9/2006 | Tamura | ............... | B62D 1/10 |
| | | | | 280/771 |
| 2007/0096424 A1* | 5/2007 | Chen | ............... | B62K 21/00 |
| | | | | 280/272 |
| 2007/0138758 A1* | 6/2007 | Chao | ............... | B62K 21/24 |
| | | | | 280/279 |
| 2013/0038033 A1* | 2/2013 | Baron | ............... | B62B 9/20 |
| | | | | 280/47.371 |
| 2017/0336785 A1 | 11/2017 | Young et al. | | |
| 2018/0022413 A1 | 1/2018 | Kim | | |

OTHER PUBLICATIONS

International Preliminary Report on Patentability and Written Opinion issued to PCT/US20/55195, dated Apr. 21, 2022.

* cited by examiner

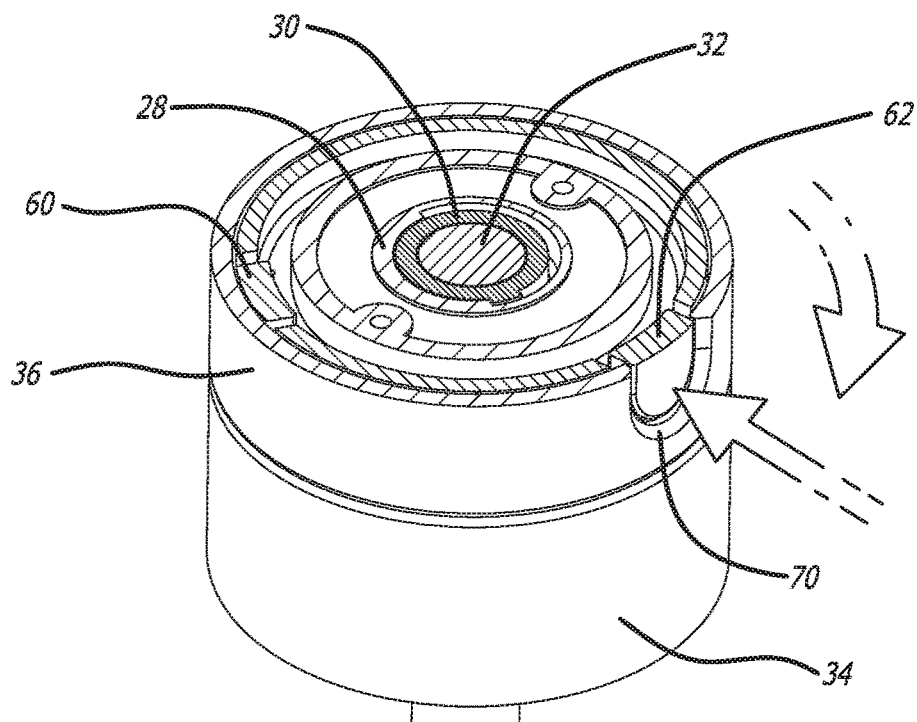
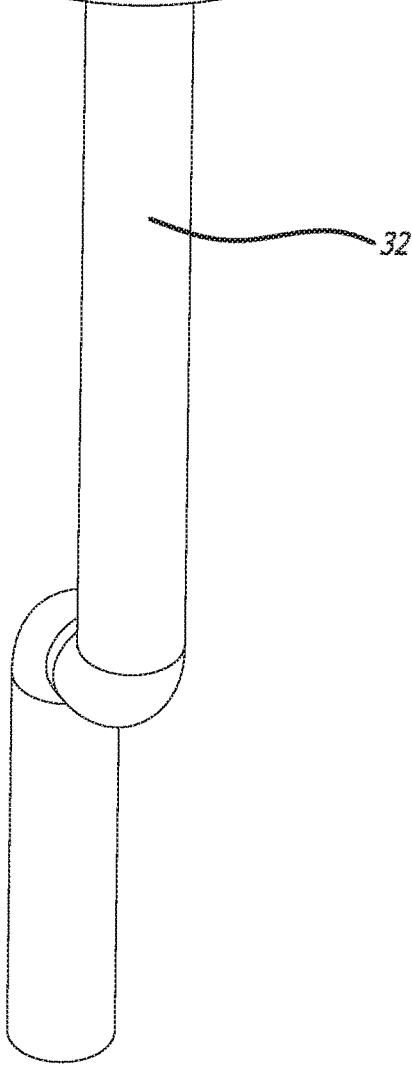
FIG. 9

LOCKABLE STEERING MECHANISM FOR RIDE-ON VEHICLE

CROSS-REFERENCE TO RELATED APPLICATIONS

This application claims the benefit of U.S. Provisional Patent Application No. 62/913,229 filed Oct. 10, 2019, which is expressly incorporated herein by reference and made a part hereof.

FEDERALLY SPONSORED RESEARCH OR DEVELOPMENT

Not Applicable.

TECHNICAL FIELD

The present disclosure relates generally to steering mechanisms, and more specifically to a lockable steering mechanism for a ride-on vehicle.

BACKGROUND

Ride-on vehicles are well known in the art. While such ride-on vehicles according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a lockable steering mechanism for a children's ride-on vehicle.

The disclosed technology further relates to a lockable steering mechanism for a children's ride-on vehicle, comprising: a base having an opening, a rotatable steering shaft extending through the opening in the base, the steering shaft having a first end and a second end, the second end of the steering shaft being coupled to a steering link that is coupled to front wheels of the vehicle; a lifter guide rotationally and axially fixed to the steering shaft; a lifter rotationally fixed to the lifter guide, the lifter being axially moveable with respect to the lifter guide; a locking ring rotatably coupled to the base, the locking ring rotating on the base from a first position to a second position; and, a steering wheel axially fixed to the first end of the steering shaft, wherein the lifter engages the steering wheel when the locking ring is in the first position to rotationally fix the steering wheel to the steering shaft, and wherein the lifter is rotationally decoupled from the steering wheel when the locking ring is in a second position to allow the steering wheel to be rotationally decoupled from the steering shaft.

The disclosed technology further relates to a lockable steering mechanism for a children's ride-on vehicle, comprising: a steering shaft having a first end and a second end, the second end of the steering shaft being coupled to a steering link coupled to front wheels of the vehicle; a locking ring rotatable with respect to the steering shaft from a first position to a second position; and, a steering wheel axially fixed to a first end of the steering shaft, the steering wheel rotationally fixed to the steering shaft in a first mode when the locking ring is in the first position, and the steering wheel rotationally decoupled from the steering shaft in a second mode when the locking ring is in the second position.

The disclosed technology further relates to a lockable steering mechanism for a children's ride-on vehicle, comprising: a base having a bore; a locking ring rotatably coupled to the base and rotatable between a first locked position and a second locked position; a steering shaft extending through the bore in the base, the steering shaft having a first end and a second end, the second end of the steering shaft being coupled to a steering link; and, a steering wheel axially fixed to the first end of the steering shaft, the steering wheel rotationally fixed to the steering shaft in a first mode when the locking ring is in the first locked position, and the steering wheel rotationally decoupled from the steering shaft in a second mode when the locking ring is in the second locked position.

The disclosed technology further relates to a lockable steering mechanism for a children's ride-on vehicle, wherein when the locking ring is in the second position the front wheels of the vehicle are turned to a specific angle and remain at that angle until the locking ring is moved from the second position.

The disclosed technology further relates to a lockable steering mechanism for a children's ride-on vehicle, wherein the steering wheel can be turned when the locking ring is in the second position, and wherein turning of the steering wheel when the locking ring is in the second position does not cause the front wheels to turn.

The disclosed technology further relates to a lockable steering mechanism for a children's ride-on vehicle, when the locking ring is in the second position and the steering wheel is turned, the steering shaft remains rotationally fixed and does not turn.

The disclosed technology further relates to a lockable steering mechanism for a children's ride-on vehicle, wherein the lifter has a receiver, wherein the steering wheel has a protrusion that is adapted to mate with the receiver of the lifter, wherein when the locking ring is in the first position the receiver of the lifter mates with the protrusion of the steering wheel and rotationally fixes the steering wheel to the lifter, and wherein when the locking ring is in the second position the receiver of the lifter is spaced an axial distance from the protrusion of the steering wheel and the steering wheel is decoupled from the lifter and rotationally decoupled from the steering shaft.

The disclosed technology further relates to a lockable steering mechanism for a children's ride-on vehicle, wherein the locking ring has an opening in a sidewall thereof, wherein the base has a first button and a second button, the first button being positioned within the opening of the locking ring when the locking ring is in the first position, thereby locking the locking ring in the first position, and the second button being positioned within the opening of the locking ring when the locking ring is in the second position, thereby locking the locking ring in the second position.

The disclosed technology further relates to a lockable steering mechanism for a children's ride-on vehicle, wherein the first and second buttons can be separately pushed in by the user to disengage the first and second buttons, respectively, from the opening in the locking ring to allow the locking ring to be rotated between the first and second positions.

The disclosed technology further relates to a lockable steering mechanism for a children's ride-on vehicle, wherein the lifter is in a first axial position when the locking ring is in its first position, wherein the lifter is a second axial position distinct from the first axial position when the locking ring is in the second position, and further comprising a spring to bias the lifter to the second position.

The disclosed technology further relates to a lockable steering mechanism for a children's ride-on vehicle, wherein the lifter has a cam follower surface that mates with a cam surface of the locking ring, and wherein rotation of the locking ring results in the cam surface of the locking ring axially moving the lifter.

The disclosed technology further relates to a lockable steering mechanism for a children's ride-on vehicle, further comprising a stopper that extends from the steering wheel and into an opening of the locking ring, the opening of the locking ring having spaced apart stops that separately engage the stopper to operate as rotation restrictors for the steering wheel.

The disclosed technology further relates to a lockable steering mechanism for a children's ride-on vehicle, further comprising a base, the locking ring rotating about the base.

The disclosed technology further relates to a lockable steering mechanism for a children's ride-on vehicle, wherein the locking ring has an opening in a sidewall thereof, wherein the base has a first button and a second button, the first button being positioned within the opening of the locking ring when the locking ring is in the first locked position, thereby locking the locking ring in the first locked position, and the second button being positioned within the opening of the locking ring when the locking ring is in the second locked position, thereby locking the locking ring in the second locked position.

The disclosed technology further relates to a lockable steering mechanism for a children's ride-on vehicle, further comprising a lifter guide and a lifter, the lifter guide being rotationally and axially fixed to the steering shaft, the lifter being rotationally fixed to the lifter guide, the lifter being axially moveable with respect to the lifter guide, wherein the lifter engages the steering wheel when the locking ring is in the first position to rotationally fix the steering wheel to the steering shaft, and wherein the lifter is rotationally disengaged from the steering wheel when the locking ring is in a second position to allow the steering wheel to be rotationally decoupled from the steering shaft.

The disclosed technology further relates to a lockable steering mechanism for a children's ride-on vehicle, wherein the lifter has a receiver, wherein the steering wheel has a protrusion that is adapted to mate with the receiver of the lifter, wherein when the locking ring is in the first position the receiver of the lifter mates with the protrusion of the steering wheel and rotationally fixes the steering wheel to the lifter, and wherein when the locking ring is in the second position the receiver of the lifter is spaced an axial distance from the protrusion of the steering wheel and the steering wheel is decoupled from the lifter and rotationally decoupled from the steering shaft.

The disclosed technology further relates to a lockable steering mechanism for a children's ride-on vehicle, wherein when the locking ring is in the second position the front wheels of the vehicle are turned to a specific angle and remain at that angle until the locking ring is moved from the second position, wherein the steering wheel can be turned when the locking ring is in the second position and turning of the steering wheel when the locking ring is in the second position does not cause the front wheels to turn, and wherein when the locking ring is in the second position and the steering wheel is turned, the steering shaft remains rotationally fixed and does not turn.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 9 is a top cross-sectional view through a lock button of a portion of the lockable steering mechanism for a ride-on vehicle, with the lockable steering mechanism in the locked position, according to the present disclosure.

DETAILED DESCRIPTION

Figure 1:
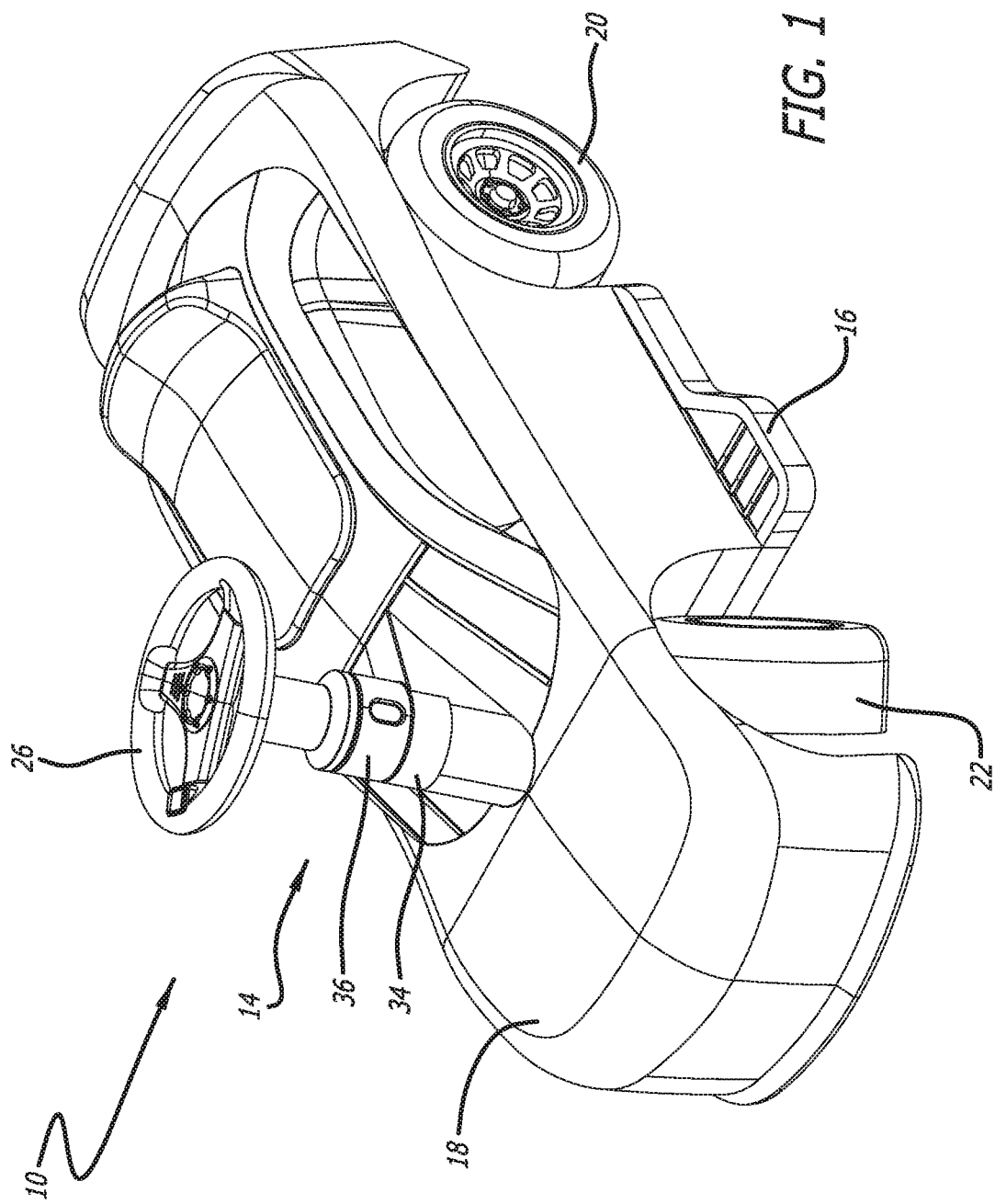
FIG. 1 is a top front perspective view of a ride-on vehicle with a lockable steering mechanism according to the present disclosure.
Figure 2:
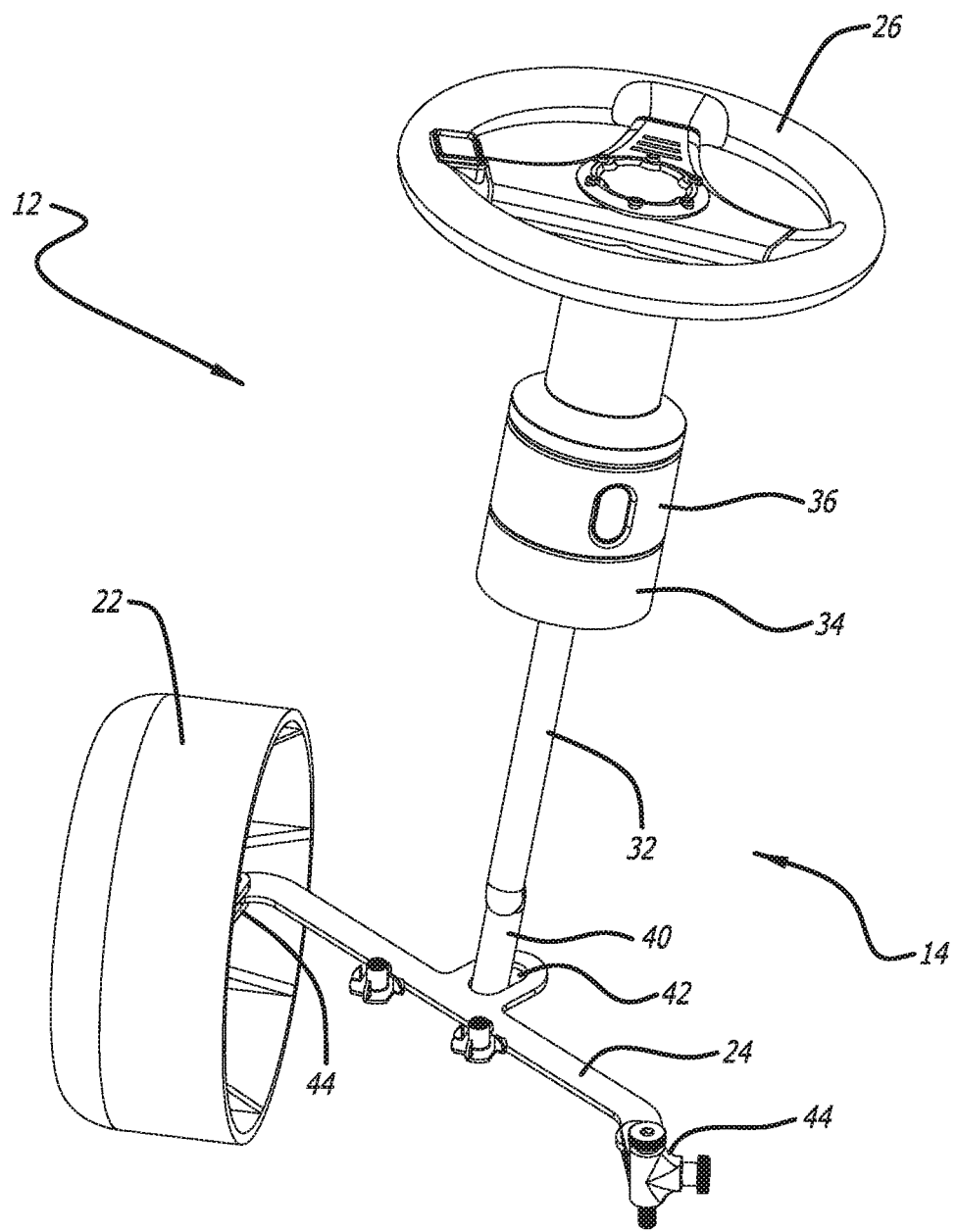
FIG. 2 is a partial perspective view of a lockable steering mechanism and steering assembly for a ride-on vehicle according to the present disclosure.

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Referring now to the figures, and initially to FIGS. 1-3A, a ride-on vehicle 10 is illustrated having a steering assembly 12 with a lockable steering mechanism 14. In various embodiments, the ride-on vehicle 10 is a battery powered electric vehicle 10 for children. The vehicle 10 is operable in two modes, a child steer mode where the child controls the steering of the vehicle 10 (see FIGS. 5A-7), and a locked steering mode where the steering wheel is decoupled from the steering shaft and the vehicle 10 travels in a circle of a fixed diameter (see FIGS. 8A-9). In the locked steering mode the child is able to rotate the steering wheel to pretend that the child is steering, but because the steering wheel is decoupled from the steering shaft, the steering wheel does not alter or control the path of travel. Typically, the locked steering mode may be preferred for younger children.

Figure 3A:
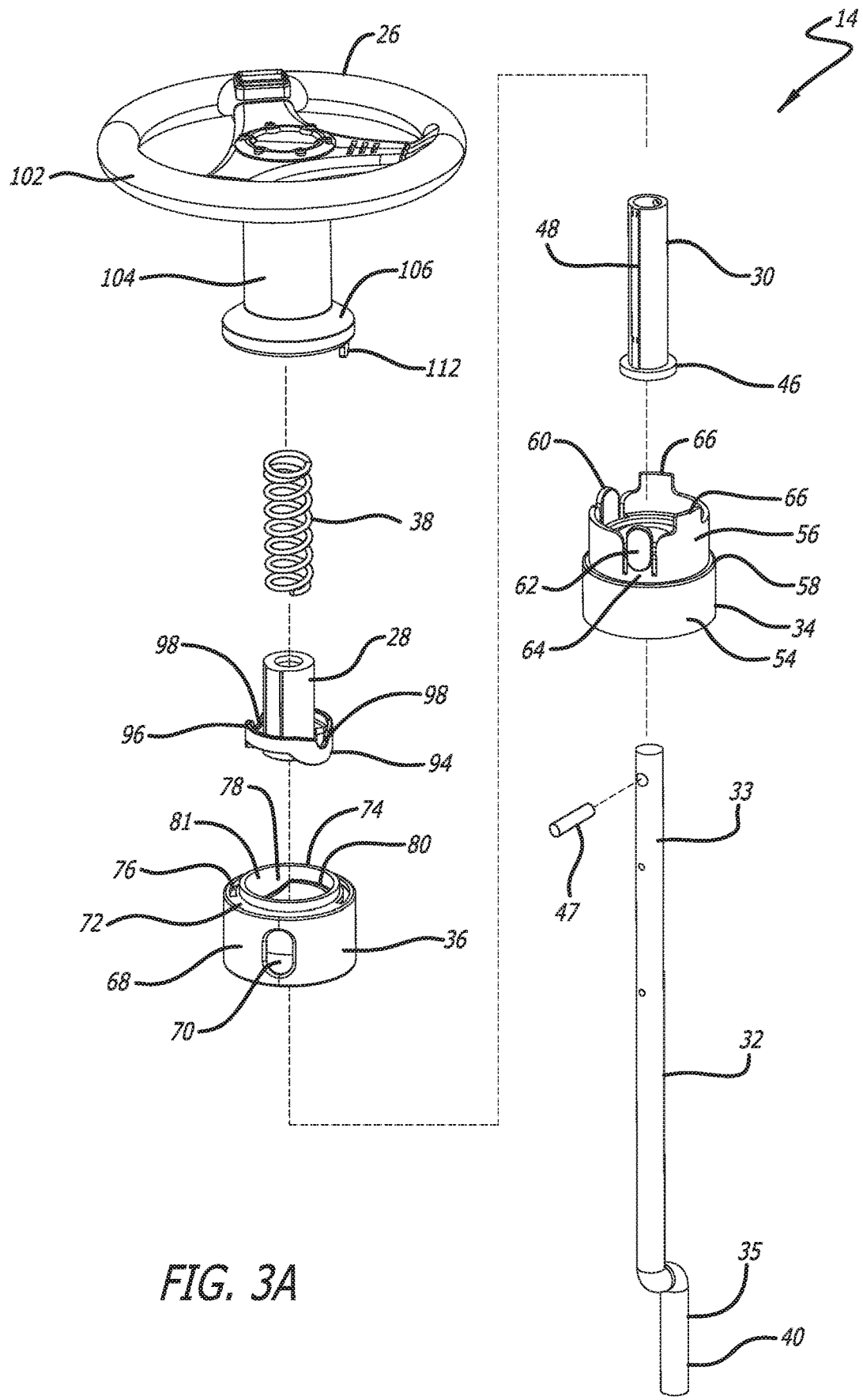
FIG. 3A is an exploded perspective view of a lockable steering mechanism for a ride-on vehicle according to the present disclosure.

In general, in one embodiment, the ride-on vehicle 10 comprises a chassis 16, a vehicle body 18, a drive system (not shown), a motor (not shown), rear wheels 20, front wheels 22, and a steering assembly 12. In one embodiment, the steering assembly 12 comprises a lockable steering mechanism 14 connected to a steering link 24. In one embodiment, as shown in FIG. 3A, the lockable steering mechanism 14 generally comprises a steering wheel 26, a lifter 28, a lifter guide 30, a steering shaft 32, a base 34, a locking ring 36 and a biasing member or spring 38. While the base 34 is shown separate from the vehicle body 18 in several of the figures, in a preferred embodiment the base 34 is fixed to or integral with the vehicle body 18. When the lockable steering mechanism 14 is in the child steer mode, movement of the steering wheel 26 causes the steering shaft 32 to rotate.

The steering shaft 32 has a first end 33 and a second end 35. In one embodiment, the steering shaft 32 extends through the opening 63 in the base 34. The steering shaft 32 has an offset 40 adjacent the second end 35 that is coupled to, and in certain embodiments, secured within an opening 42 in the steering link 24 such that rotation of the steering shaft 32 causes approximately side-to-side linear movement of the steering link 24 to effectuate turning of the front wheels 22. In various embodiments, the steering shaft 32 is rotatable, such as via the steering wheel 26 or locking ring 36 as discussed herein. In one embodiment, the front wheels 22 are coupled to or connected to the steering link 24 with steering knuckles 44 to allow the generally linear movement of the steering link 24 to cause turning of the front wheels 22 toward the left and right, respectively, for turning the vehicle 10.

Figure 5A:
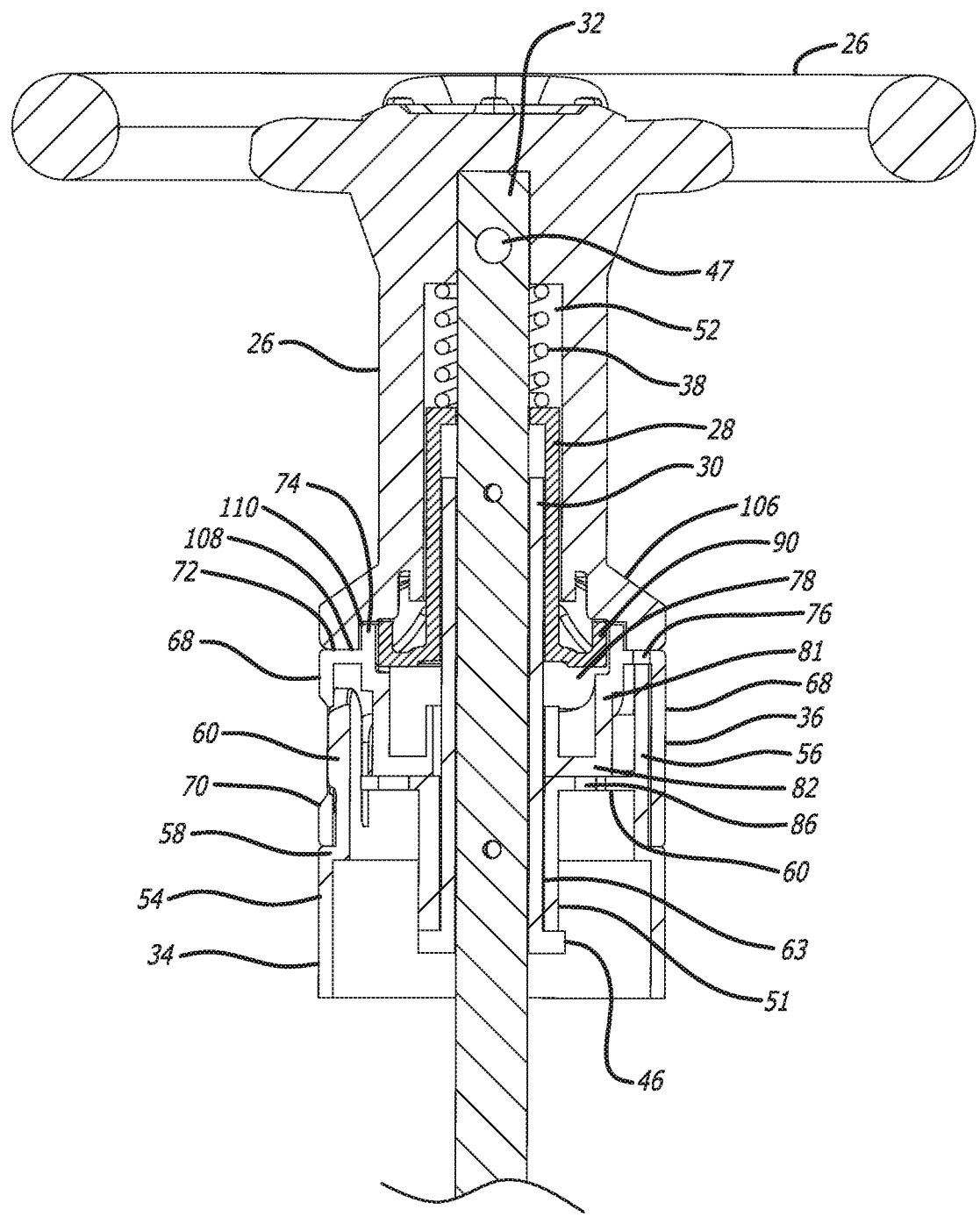
FIG. 5A is a side cross-sectional view, about a centerline of the steering wheel, of a portion of the lockable steering mechanism for a ride-on vehicle, with the lockable steering mechanism in the unlocked position so that the steering wheel is operable, according to the present disclosure.
Figure 5B:
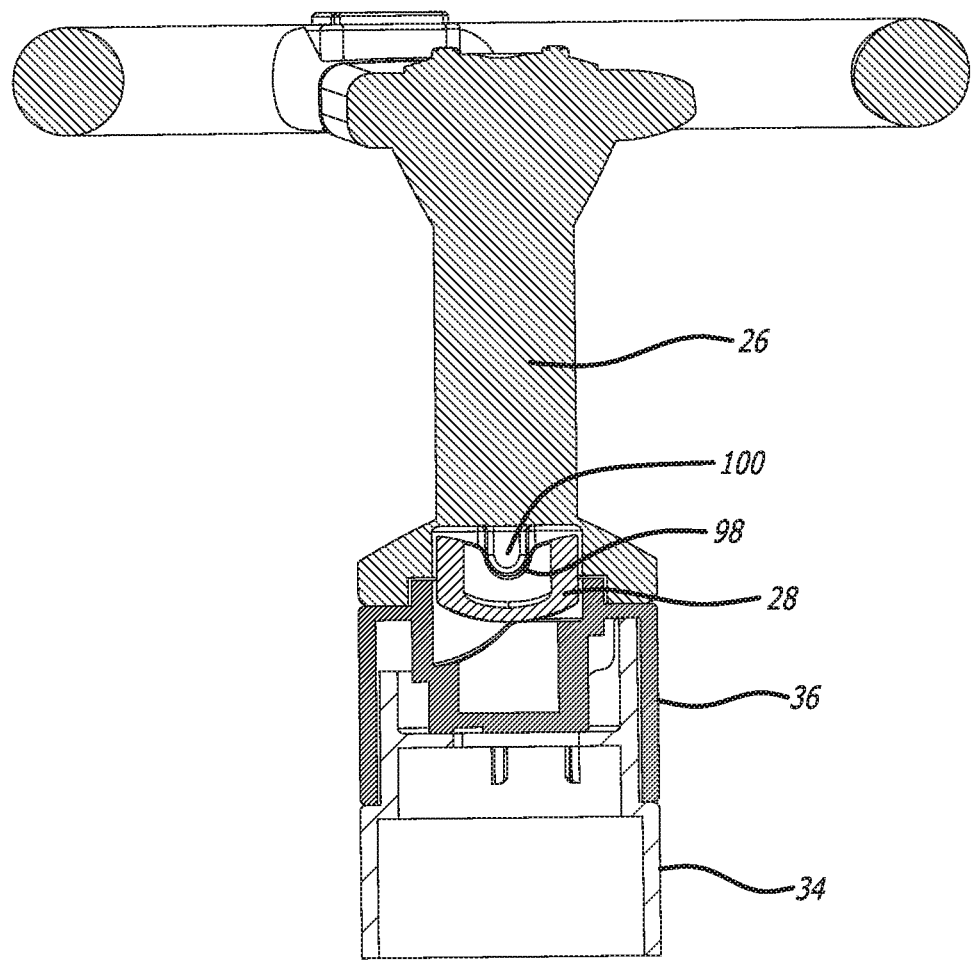
FIG. 5B is a side cross-sectional view, about a location radial of the centerline of the steering wheel, of a portion of the lockable steering mechanism for a ride-on vehicle, with the lockable steering mechanism in the unlocked position so that the steering wheel is operable, according to the present disclosure.
Figure 6:
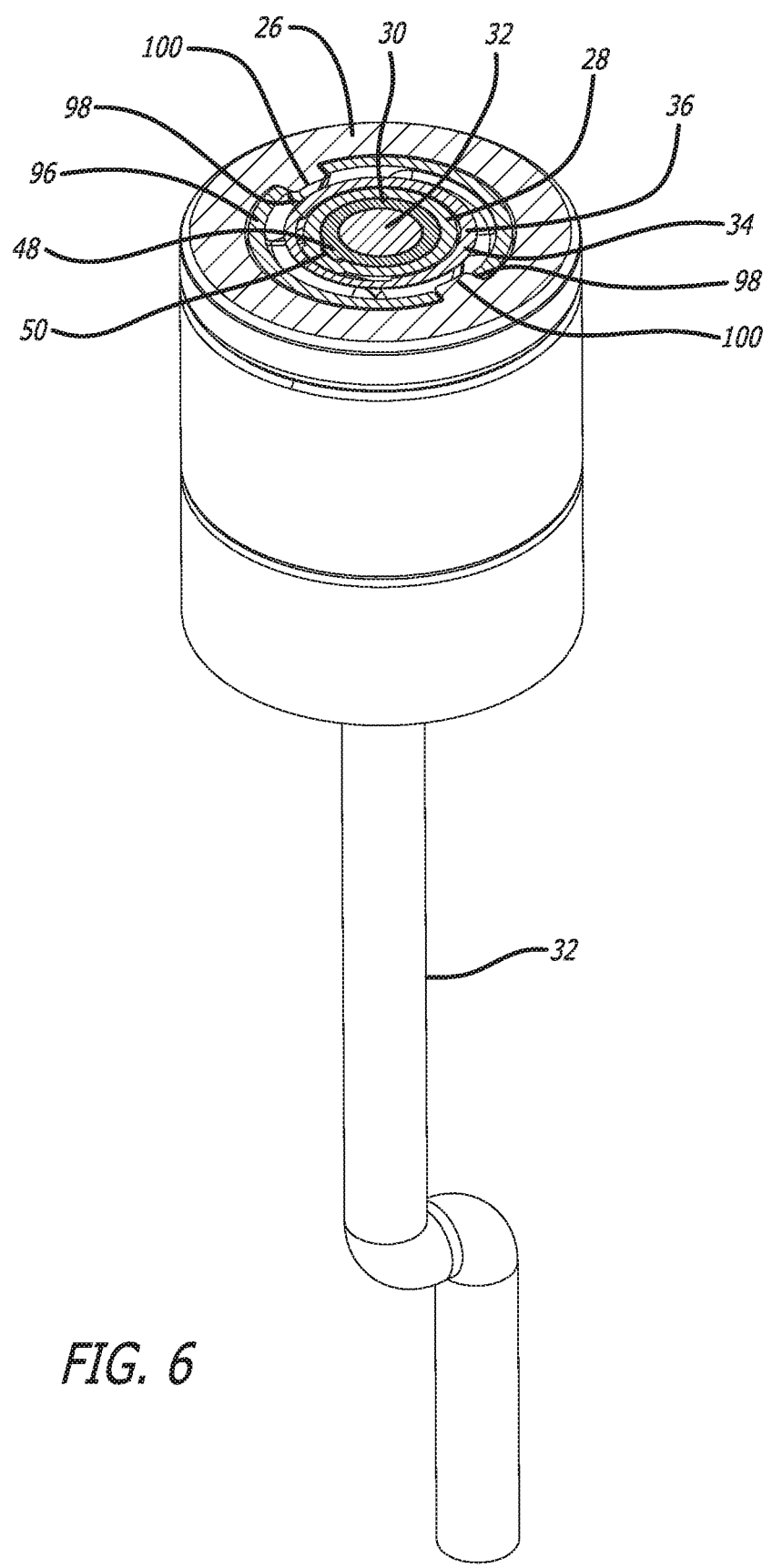
FIG. 6 is a top cross-sectional view through the locking nubs on the steering wheel of the lockable steering mechanism for a ride-on vehicle, with the lockable steering mechanism in the unlocked position so that the steering wheel is operable, according to the present disclosure.
Figure 8A:
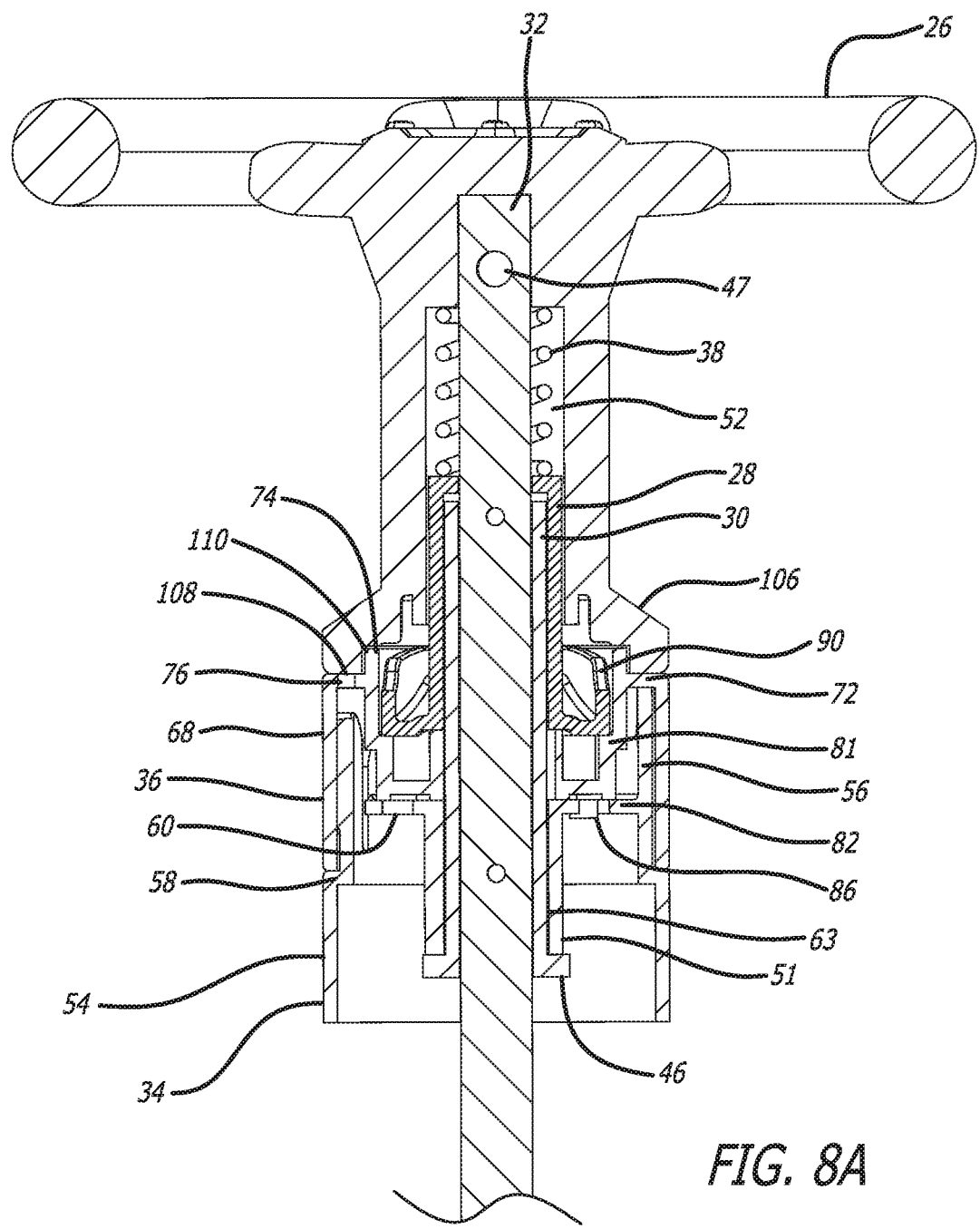
FIG. 8A is a side cross-sectional view, about a centerline of the steering wheel, of a portion of the lockable steering mechanism for a ride-on vehicle, with the lockable steering mechanism in the locked position so that the steering wheel is not operable, according to the present disclosure.
Figure 8B:
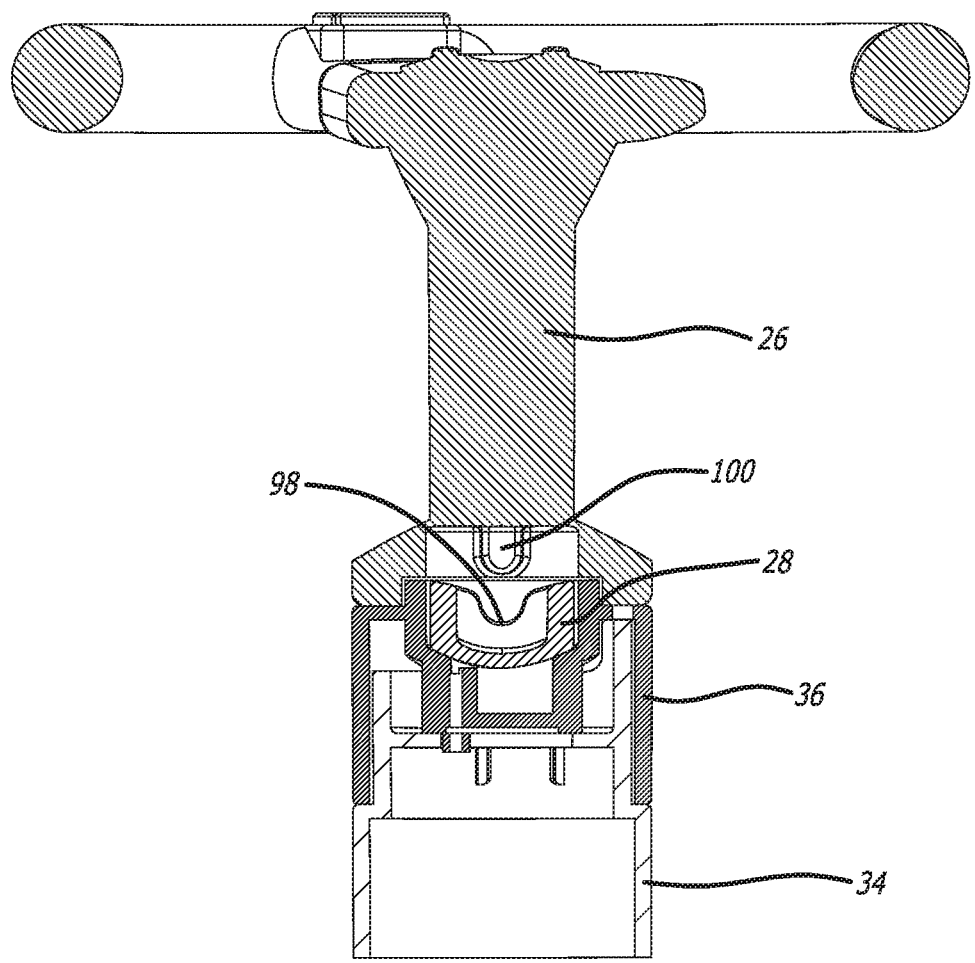
FIG. 8B is a side cross-sectional view, about a location radial of the centerline of the steering wheel, of a portion of the lockable steering mechanism for a ride-on vehicle, with the lockable steering mechanism in the locked position so that the steering wheel is not operable, according to the present disclosure.

As discussed herein, in one embodiment, when the lockable steering mechanism 14 is in the child steer mode the steering wheel 26 directly engages the lifter 28 as shown in FIGS. 5A, 5B and 6. The lifter 28 is rotationally fixed with respect to the steering shaft 32 such that when the user turns the steering wheel 26 the steering shaft 32 will rotate to control turning of the front wheels 22. Conversely, in the locked steering mode the steering wheel 26 is disengaged from the lifter 28, as shown in FIGS. 8A and 8B, such that rotation of the steering wheel 26 does not cause rotation of the lifter 28 or steering shaft 32. And, in one embodiment, in the locked steering mode the steering shaft 32 is fixed in a rotated position to retain the front wheels 22 in a left turn orientation as shown in FIG. 1. Accordingly, in the locked steering mode the vehicle 10 will turn left in a circle of a predetermined diameter and will not be controlled by the steering wheel 26. In one embodiment, the locked steering mode occurs when the locking ring 36 is in the second position. In this embodiment, the front wheels 22 of the vehicle are turned to a specific angle and remain at that angle until the locking ring 36 is moved from the second position.

As shown in FIGS. 3A, 4, 5A and 5B, in one embodiment, the lifter guide 30 is fixed both axially and rotationally to the steering shaft 32. The lifter guide 30 has a radially extending flange 46 at a lower end thereof, and a longitudinal key 48 that extends radially outwardly about a length of the lifter guide 30. As shown in FIG. 5A, the flange 46 of the lifter guide 30 operates as a stop against an inner tubular member 51 of the base 34. A pin 47 adjacent a first end 33 of the steering shaft 32, shown in FIGS. 3A and 5A, axially secures the steering shaft 32 to the steering wheel 26, but allows for rotation of the steering wheel 26 independent of the steering shaft 32. Thus, in one embodiment the steering wheel 26 can be turned when the locking ring 36 is in the second position, but such turning of the steering wheel 26 when the locking ring 36 is in the second position does not cause the front wheels to turn because the steering shaft 32 remains rotationally fixed when the locking ring 36 is in the second position.

Figure 4:
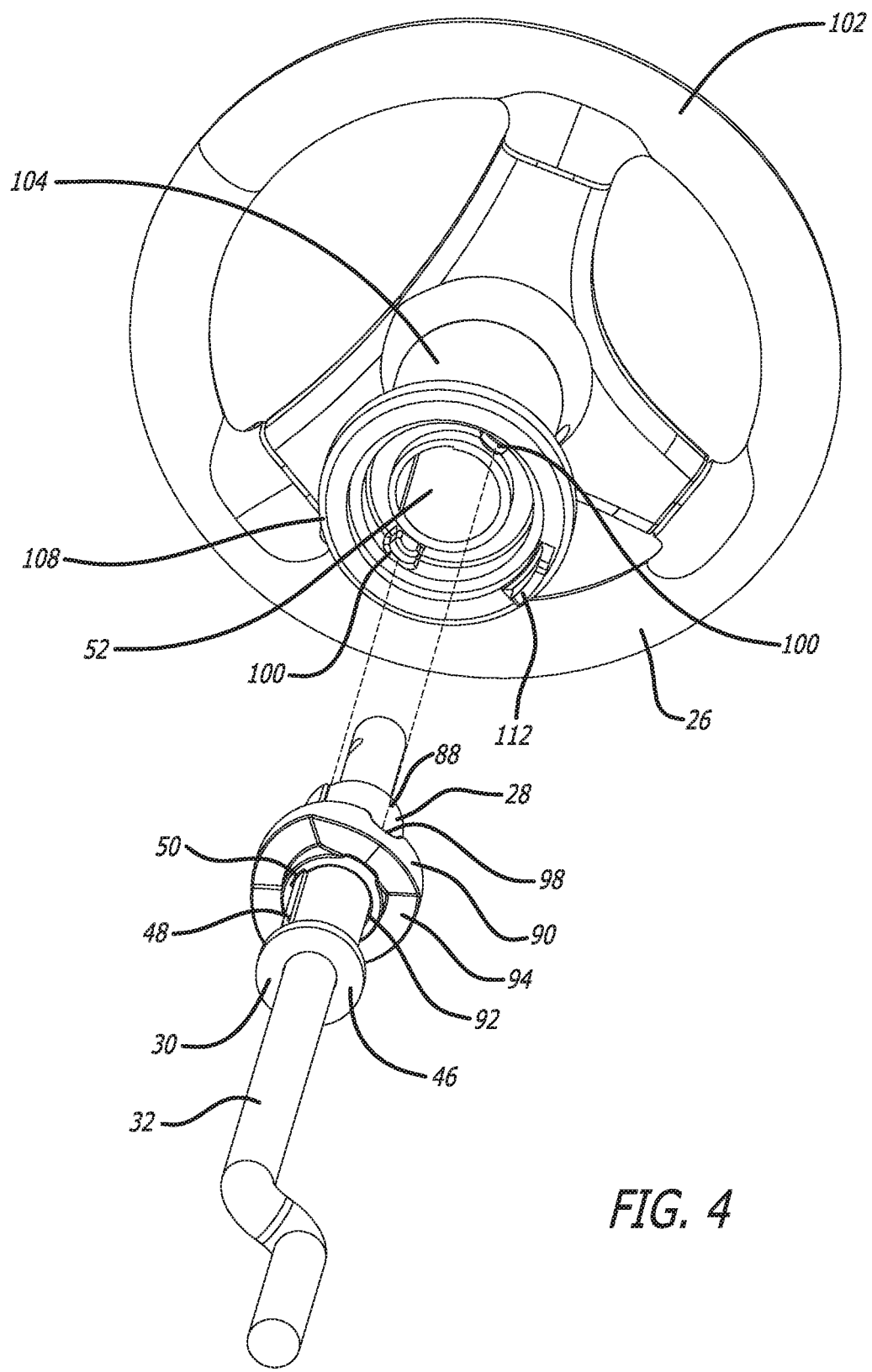
FIG. 4 is a bottom perspective view of a portion of a lockable steering mechanism for a ride-on vehicle according to the present disclosure.

Referring to FIGS. 4 and 6, the lifter 28 is rotationally fixed to the lifter guide 30, but is longitudinally or axially moveable with respect to the lifter guide 30. For example, in FIGS. 5A and 5B, the lifter 28 is in the axially raised position because the lockable steering mechanism 14 is in the child steer mode, and in FIGS. 8A and 8B the lifter 28 is in the axially lowered position because the lockable steering mechanism 14 is in the locked steering mode. To allow for the longitudinal or axial movement, the lifter 28 has an internal longitudinal slot 50 that receives the longitudinal key 48 of the lifter guide 30. Thus, because of the engagement of the longitudinal key 48 of the lifter guide 30 within the longitudinal slot 50 of the lifter 28, the lifter 28 can move longitudinally or axially but not rotationally with respect to the lifter guide 30. As shown in FIGS. 5A and 8A, a spring 38 is provided within the bore 52 of the steering wheel 26 to push against the lifter 28 and to bias the lifter 28 down on the lifter guide 30. As explained herein, clockwise rotation of the locking ring 36 causes upward axial movement of the lifter 28 to move the lifter 28 from the lowered position to the raised position against the force of the bias spring 38 (to place the lockable steering mechanism 14 in the child steer mode), and counterclockwise rotation of the locking ring 36 in connection with the spring force of the spring 38 causes downward axial movement of the lifter 28 to move the lifter 28 from the raised position to the lowered position (to place the lockable steering mechanism 14 in the locked steering mode). Thus, the lifter 28 engages the steering wheel 26 when the locking ring 36 is in the first position to rotationally fix the steering wheel 26 to the steering shaft 32, and the lifter 28 is rotationally decoupled from the steering wheel 26 when the locking ring 36 is in a second position to allow the steering wheel 26 to be rotationally decoupled from the steering shaft 32.

As shown in FIGS. 1, 2, 5A-9, the locking ring 36 resides between the steering wheel 26 and the base 34, and is rotational with respect to the base 34 and the steering wheel 26. In one embodiment, the locking ring 36 is rotatably coupled to the base 34. In one embodiment, the base 34 has a skirt 54, an upper wall 56 with a smaller outside diameter than an outside diameter of the skirt 54, and a shoulder 58 between the skirt 54 and the upper wall 56. The base 34 also has a floor that extends between the inner diameter of the upper wall 56. In one embodiment, as shown in FIGS. 5A, 7, 8A and 9, the inner tubular member 51 of the base 34 extends from the floor in a direction opposite the upper wall 56. The tubular member 51 has an opening 63 or bore 63, preferably with stops 65 therein. The stops 65 may engage the longitudinal key 48 of the lifter guide 30 as a rotation restrictor for the steering mechanism 14. In one embodiment, pivotally moveable first and second buttons 60, 62 are provided as part of the upper wall 56. The buttons 60, 62 are connected to the base 34 with respective living hinges 64 that allow the buttons 60, 62 to flex or pivot inwardly under a radially inward force but then to spring back when the force is removed. Finally, two fingers 66 extend upwardly from the upper wall 56 and away from the shoulder 58.

Figure 3B:
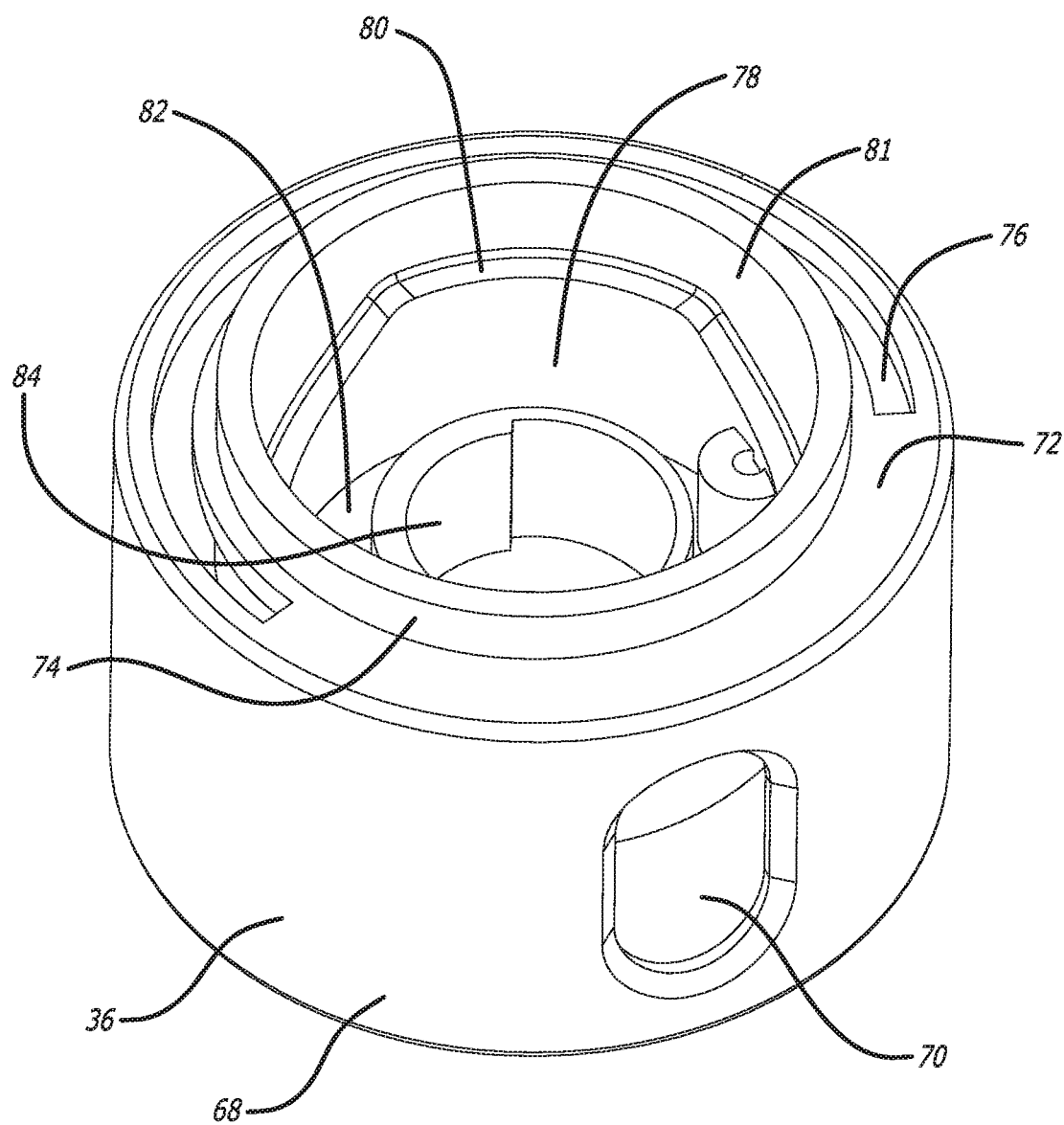
FIG. 3B is a perspective view of a locking ring for a lockable steering mechanism for a ride-on vehicle according to the present disclosure.

As best shown in FIGS. 3B and 5A, in one embodiment the locking ring 36 has a sidewall or an outer wall 68 with a button opening 70 in the outer wall 68. The button opening 70 is sized to separately receive the first and second buttons 60, 62. A shoulder 72 extends radially inward from a top of the outer wall 68, and an annular protrusion 74 extends away from the shoulder 72 distal the outer wall 68. An annular opening 76 is provided in the shoulder 72 between the annular protrusion 74 and the outer wall 68. A cavity 78 is provided radially inward of the annular protrusion 74, and a cam surface 80 is provided adjacent a wall 81 of the cavity 78 of the locking ring 36. A bottom 82 is provided at the lower portion of the cavity 78 and is connected to the cavity wall 81, and a bore 84 is provided through the bottom 82. Stops 86 extend from an opposing side of the bottom 82 in a direction opposite the cavity 78.

In one embodiment, as shown in FIGS. 5A, 7, 8A and 9, the base 34 is seated on the lifter guide 30. Put another way, in one embodiment, the lifter guide 30 is fitted through the bore 63 of the tubular member 51 of the base 34 such that the flange 46 of the lifter guide 30 engages the lower surface of the inner tubular member 51 and operates as a stop.

Figure 7:
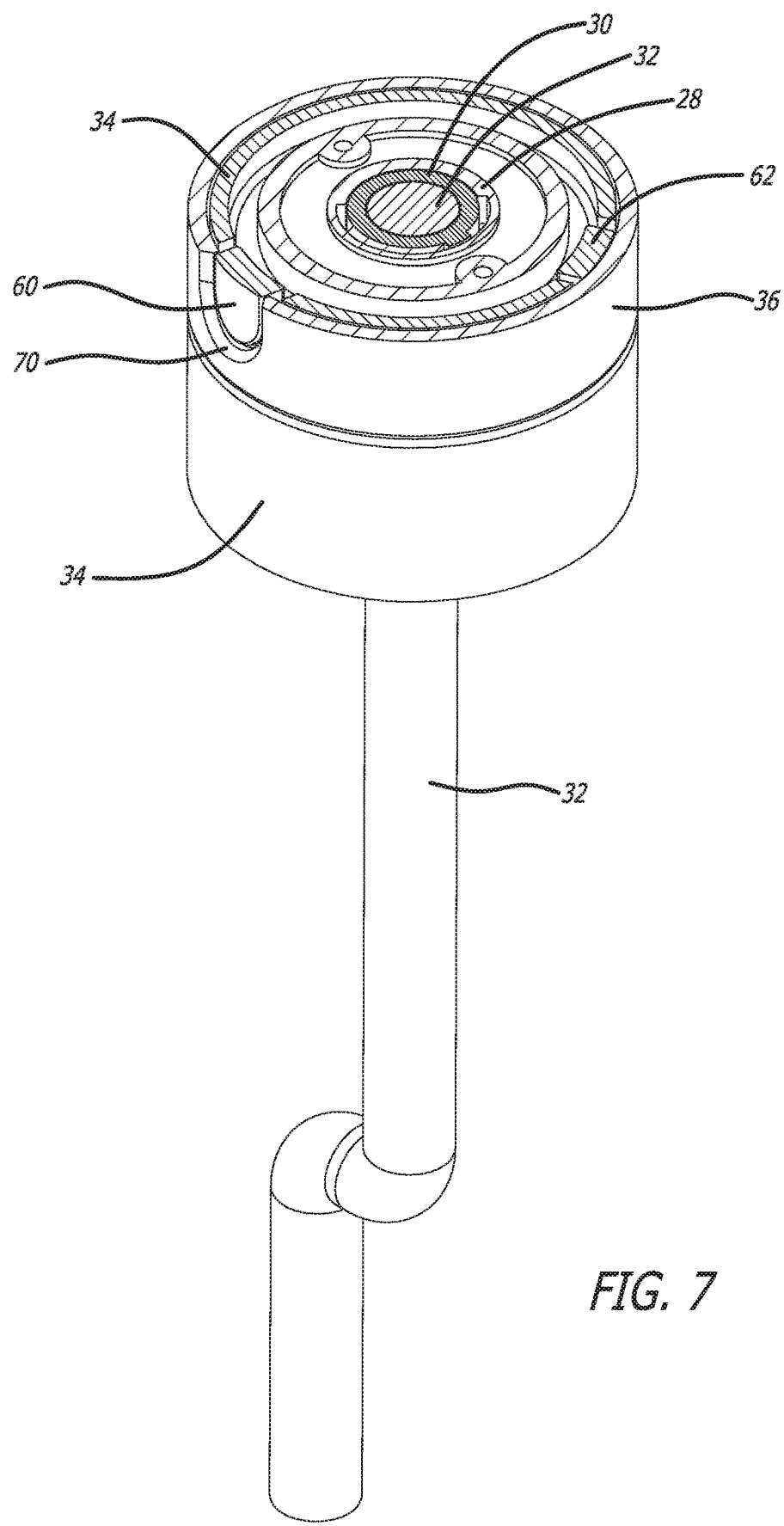
FIG. 7 is a top cross-sectional view through a lock button of a portion of the lockable steering mechanism for a ride-on vehicle, with the lockable steering mechanism in the unlocked position so that the steering wheel is operable, according to the present disclosure.

Next, in one embodiment the locking ring 36 is rotationally seated on the base 34 such that the upper wall 56 of the base 34 is provided radially concentrically inward of the outer wall 68 of the locking ring 36 and generally radially concentrically outward of the wall 81 of the cavity 78 of the locking ring 36. In that position the fingers 66 of the base 34 extend in the gap between an inner surface of the outer wall 68 of the locking ring 36 and the outer surface of the cavity wall 81, but generally not entirely through the annular opening 76 in the locking ring 36 that leads to the gap. Additionally, the lifter guide 30 and steering shaft 32 will be positioned in the bore 84 of the locking ring 36. The locking ring 36 is generally rotatable about the lifter guide 30 and steering shaft 32 between a first locked position, where the button opening 70 in the outer wall 68 of the locking ring 36 receives the first button 60 of the base 34 as shown in FIGS. 5A and 7, and a second locked position, where the button opening 70 in the outer wall 68 of the locking ring 36 receives the second button 62 of the base 34 as shown in FIGS. 8A and 9. In the first position the lockable steering mechanism is in the child steer position, and in the second position the lockable steering mechanism is in the locked steering mode.

To move the locking ring 36 from the first position (FIG. 7) to the second position (FIG. 9), in one embodiment, the user pushes the first button 60 radially inwardly (FIG. 7) to allow the locking ring 36 to clear the first button 60. Next, the user will rotate the locking ring 36 counterclockwise until the button opening 70 mates with the second button 62. The second button 62 will snap into the button opening 70 to rotationally lock the locking ring 36 in the second position (FIG. 9). To then move the locking ring 36 from the second position to the first position the user will push the second button 62 radially inwardly (FIG. 7) to allow the locking ring 36 to clear the second button 62. The user will rotate the locking ring 36 clockwise until the button opening 70 mates with the first button 60 (FIG. 7). The first button 60 will snap into the button opening 70 to rotationally lock the locking ring in the first position (FIGS. 5A and 7). In one embodiment the first button 60 is spaced approximately 135° from the second button 62.

Referring to FIGS. 3-4, 5A, 6 and 8A, in one embodiment, the lifter 28 has a generally tubular upper portion 88 extending from a lower flange component 90. A bore 92 extends through the lifter 28. The bore 92 has an internal longitudinal slot 50 that, as explained above, receives the longitudinal key 48 of the lifter guide 30. Thus, because of the engagement of the longitudinal key 48 of the lifter guide 30 within the longitudinal slot 50 of the lifter 28, the lifter 28 can move longitudinally or axially but not rotationally with respect to the lifter guide 30. The lower flange component 90 of the lifter 28 has a lower cam follower surface 94 for mating with the cam surface 80 of the locking ring 36. The lower flange component 90 of the lifter 28 also has an upper wall 96 with a pair of receivers 98 for receiving protrusions 100 from the steering wheel 26 as described herein. The protrusions 100 are adapted to mate with the receivers 98.

In one embodiment, the lifter 28 is fitted concentrically around the lifter guide 30 as explained above, with the longitudinal key 48 of the lifter guide 30 residing in the longitudinal slot 50 of the lifter 28. The cooperation of the longitudinal key 48 of the lifter guide 30 residing in the longitudinal slot 50 of the lifter 28 only allows for axial or longitudinal movement of the lifter 28. The lower flange component 90 of the lifter 28 fits partially within the cavity 78 of the locking ring 36 such that the lower cam follower surface 94 of the lifter 28 mates with the cam surface 80 of the locking ring 36. The geometry of the cam surface 80 of the locking ring 36 and the corresponding cam follower surface 94 of the lifter 28 is such, as shown in FIGS. 3A, 3B and 4, that when the locking ring 36 is in the first position as shown in FIGS. 5A, 5B, 6 and 7, the lifter 28 is in its up or raised position (also referred to as the first axial position of the lifter), and when the locking ring 36 is in the second position as shown in FIGS. 8A, 8B and 9, the locking ring 36 is in its down or lowered position (also referred to as the second axial position of the lifter). Accordingly, in one embodiment, when the locking ring 36 is rotated clockwise to the first position the cam surface 80 of the locking ring 36 operates to push the lifter 28 axially or longitudinally upward toward the steering wheel 26 via the mating of the cam surface 80 of the locking ring 36 and the cam follower surface 94 of the lifter 28. In this first position the receivers 98 of the lifter 28 mates with the protrusions 100 of the steering wheel 26 and rotationally fixes the steering wheel 26 to the lifter 28. As explained herein, in this first position of the locking ring 36 the vehicle 10 is in the child steer orientation and the child can steer the vehicle via the steering wheel 26. Conversely, in one embodiment, when the locking ring 36 is rotated counterclockwise to the second position the spring 38 pushes against the lifter 28 causing the lifter 28 to move axially or longitudinally down away from the steering wheel 26 via the mating of the cam surface 80 of the locking ring 36 and the cam follower 94 of the lifter 28. Thus, when the locking ring 36 is in the second position the receivers 98 of the lifter 28 are spaced an axial distance from the protrusions 100 of the steering wheel 26, and the steering wheel 26 is decoupled from the lifter 28 and rotationally decoupled from the steering shaft 32. Also as explained herein, in this second position of the locking ring 36 the vehicle is in the locked steering mode and the steering wheel 26 is decoupled from the steering shaft 32 and the steering shaft 32 is locked in a left turn mode so that the vehicle 10 turns in a left circle.

In one embodiment, the steering wheel 26 has a user engagement component 102 (i.e., the wheel-shaped portion 102 of the steering wheel 26) and an extension 104 extending downward therefrom. The extension 104 has a bore 52, as shown in FIGS. 4, 5A and 8A, and the spring 38 is provided within the bore 52 of the steering wheel 26 to push against the lifter 28 and to bias the lifter 28 down on the lifter guide 30 against the cam surface 80 of the locking ring 36. The steering wheel 26 also has a flange 106 extending outwardly adjacent a bottom of the extension 104. The flange 106 has a lower surface 108 that engages the shoulder 72 of the locking ring 36. Additionally, in one embodiment, a lower wall 110 of the bore 52 engages the annular protrusion 74 of the locking ring 36. This helps to allow the locking ring 36 to be able to rotate with respect to the steering wheel 26 and vice versa. As shown in FIG. 4, in one embodiment a pair of protrusions 100 extend into the bore 52. Finally, as shown in FIGS. 3A and 4, in one embodiment a stopper 112 extends from the lower surface 108 of the steering wheel 26. The stopper 112 may extend into the annular opening 76 in the locking ring 36 to engage stops to operate as rotation restrictors for the freely rotating steering wheel 26 when the steering wheel 26 is decoupled from the steering shaft 32 in the locked steering mode.

As shown in FIGS. 5B and 6, in one embodiment, when the locking ring 36 is the first position and the lifter 28 is in its axially upward position, the receivers 98 in the upper wall 96 of the lifter 28 mate with and receive the protrusions 100 of the steering wheel 26. In this orientation, when the user turns the steering wheel 26, the steering wheel 26 rotates the lifter 28 via the engagement of the protrusions 100 of the steering wheel 26 in the receivers 98 of the lifter 28 to rotate the steering shaft 32 and turn the front wheels 22. This is because, in one embodiment, the lifter 28 is rotationally fixed to the steering shaft 32 via the engagement of the longitudinal key 48 of the lifter guide 30 residing in the longitudinal slot 50 of the lifter 28. Thus, as explained herein, when the steering shaft 32 rotates it moves the steering link 24 to turn the front wheels 22 of the vehicle 10. This is what is referred to as the child steer mode. In the child steer mode various stops operate as steering limiters to limit the amount of rotation available to the steering wheel 26 and overall steering mechanism 14.

Conversely, as shown in FIGS. 8A and 8B, when the locking ring 36 is the second position and the lifter 28 is in its axially down position, the receivers 98 in the upper wall 96 of the lifter 28 are spaced an axial distance from the protrusions 100 of the steering wheel 26 (see FIG. 8B). In this orientation, the steering wheel 26 is decoupled from the lifter 28 and thus decoupled from the steering shaft 32. Further, since the locking ring 36 is fixed in the second position the lifter 28 is also fixed in its lowered position. In this lowered position the steering shaft 32 is fixed in a left turn such that the vehicle 10 turns left in a circle, whereas the steering wheel 26 can be freely turned/rotated without having any effect on the steering shaft 32 or front wheels 22.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A lockable steering mechanism for a children's ride-on vehicle, comprising:
    a base having an opening,
    a rotatable steering shaft extending through the opening in the base, the steering shaft having a first end and a second end, the second end of the steering shaft being coupled to a steering link that is coupled to front wheels of the vehicle;
    a lifter guide rotationally and axially fixed to the steering shaft;
    a lifter rotationally fixed to the lifter guide, the lifter being axially moveable with respect to the lifter guide;
    a locking ring rotatably coupled to the base, the locking ring rotating from a first position to a second position; and,
    a steering wheel axially fixed to the first end of the steering shaft, wherein the lifter engages the steering wheel when the locking ring is in the first position to rotationally fix the steering wheel to the steering shaft, and wherein the lifter is rotationally decoupled from the steering wheel when the locking ring is in the second position to allow the steering wheel to be rotationally decoupled from the steering shaft.

2. The lockable steering mechanism of claim 1, wherein when the locking ring is in the second position the front wheels of the vehicle are turned to a specific angle and remain at that angle until the locking ring is moved from the second position.

3. The lockable steering mechanism of claim 1, wherein the steering wheel can be turned when the locking ring is in the second position, and wherein turning of the steering wheel when the locking ring is in the second position does not cause the front wheels to turn.

4. The lockable steering mechanism of claim 1, wherein when the locking ring is in the second position and the steering wheel is turned, the steering shaft remains rotationally fixed and does not turn.

5. The lockable steering mechanism of claim 1, wherein the lifter has a receiver, wherein the steering wheel has a protrusion that is adapted to mate with the receiver of the lifter, wherein when the locking ring is in the first position the receiver of the lifter mates with the protrusion of the steering wheel and rotationally fixes the steering wheel to the lifter, and wherein when the locking ring is in the second position the receiver of the lifter is spaced an axial distance from the protrusion of the steering wheel and the steering wheel is decoupled from the lifter and rotationally decoupled from the steering shaft.

6. The lockable steering mechanism of claim 1, wherein the locking ring has an opening in a sidewall thereof, wherein the base has a first button and a second button, the first button being positioned within the opening of the locking ring when the locking ring is in the first position, thereby locking the locking ring in the first position, and the second button being positioned within the opening of the locking ring when the locking ring is in the second position, thereby locking the locking ring in the second position.

7. The lockable steering mechanism of claim 6, wherein the first and second buttons can be separately pushed in by the user to disengage the first and second buttons, respectively, from the opening in the locking ring to allow the locking ring to be rotated between the first and second positions.

8. The lockable steering mechanism of claim 1, wherein the lifter is in a first axial position when the locking ring is in its first position, wherein the lifter is a second axial position distinct from the first axial position when the locking ring is in the second position, and further comprising a spring to bias the lifter to the second position.

9. The lockable steering mechanism of claim 1, wherein the lifter has a cam follower surface that mates with a cam surface of the locking ring, and wherein rotation of the locking ring results in the cam surface of the locking ring axially moving the lifter.

10. The lockable steering mechanism of claim 1, further comprising a stopper that extends from the steering wheel and into an opening of the locking ring, the opening of the locking ring having spaced apart stops that separately engage the stopper to operate as rotation restrictors for the steering wheel.

11. A lockable steering mechanism for a children's ride-on vehicle, comprising:
- a steering shaft having a first end and a second end, the second end of the steering shaft being coupled to a steering link coupled to front wheels of the vehicle;
- a locking ring rotatable with respect to the steering shaft from a first position to a second position;
- a steering wheel axially fixed to the first end of the steering shaft, the steering wheel rotationally fixed to the steering shaft in a first mode when the locking ring is in the first position, and the steering wheel rotationally decoupled from the steering shaft in a second mode when the locking ring is in the second position; and,
- a lifter guide and a lifter, the lifter guide being rotationally and axially fixed to the steering shaft, the lifter being rotationally fixed to the lifter guide, the lifter being axially moveable with respect to the lifter guide, wherein the lifter engages the steering wheel when the locking ring is in the first position to rotationally fix the steering wheel to the steering shaft, and wherein the lifter is rotationally disengaged from the steering wheel when the locking ring is in the second position to allow the steering wheel to be rotationally decoupled from the steering shaft.

12. The lockable steering mechanism of claim 11, further comprising a base, the locking ring rotating about the base.

13. The lockable steering mechanism of claim 12, wherein the locking ring has an opening in a sidewall thereof, wherein the base has a first button and a second button, the first button being positioned within the opening of the locking ring when the locking ring is in the first position, thereby locking the locking ring in the first position, and the second button being positioned within the opening of the locking ring when the locking ring is in the second position, thereby locking the locking ring in the second position.

14. The lockable steering mechanism of claim 11, wherein the lifter has a receiver, wherein the steering wheel has a protrusion that is adapted to mate with the receiver of the lifter, wherein when the locking ring is in the first position the receiver of the lifter mates with the protrusion of the steering wheel and rotationally fixes the steering wheel to the lifter, and wherein when the locking ring is in the second position the receiver of the lifter is spaced an axial distance from the protrusion of the steering wheel and the steering wheel is decoupled from the lifter and rotationally decoupled from the steering shaft.

15. The lockable steering mechanism of claim 11, wherein when the locking ring is in the second position the front wheels of the vehicle are turned to a specific angle and remain at that angle until the locking ring is moved from the second position, wherein the steering wheel can be turned when the locking ring is in the second position and turning of the steering wheel when the locking ring is in the second position does not cause the front wheels to turn, and wherein when the locking ring is in the second position and the steering wheel is turned, the steering shaft remains rotationally fixed and does not turn.

16. A lockable steering mechanism for a children's ride-on vehicle, comprising:
- a base having a bore;
- a locking ring rotatably coupled to the base and rotatable between a first locked position and a second locked position;
- a steering shaft extending through the bore in the base, the steering shaft having a first end and a second end, the second end of the steering shaft being coupled to a steering link; and,
- a steering wheel axially fixed to the first end of the steering shaft, the steering wheel rotationally fixed to the steering shaft in a first mode when the locking ring is in the first locked position, and the steering wheel rotationally decoupled from the steering shaft in a second mode when the locking ring is in the second locked position, wherein the locking ring has an opening in a sidewall thereof, wherein the base has a first button and a second button, the first button being positioned within the opening of the locking ring when the locking ring is in the first locked position, thereby locking the locking ring in the first locked position, and the second button being positioned within the opening of the locking ring when the locking ring is in the second locked position, thereby locking the locking ring in the second locked position, and wherein the first and second buttons can be separately pushed in by the user to disengage the first and second buttons, respectively, from the opening in the locking ring to allow the locking ring to be rotated between the first and second locked positions.

17. The lockable steering mechanism of claim 16, further comprising a lifter guide and a lifter, the lifter guide being rotationally and axially fixed to the steering shaft, the lifter being rotationally fixed to the lifter guide, the lifter being axially moveable with respect to the lifter guide, wherein the lifter engages the steering wheel when the locking ring is in the first locked position to rotationally fix the steering wheel to the steering shaft, and wherein the lifter is rotationally disengaged from the steering wheel when the locking ring is in the second locked position to allow the steering wheel to be rotationally decoupled from the steering shaft.

* * * * *